United States Patent
Müller

[11] 3,788,147
[45] Jan. 29, 1974

[54] DEVICE FOR THE BALANCING OF OUT OF BALANCE BODIES ESPECIALLY VEHICLE WHEELS

[75] Inventor: Richard Müller, Worfelden, Germany

[73] Assignee: Gebr. Hofman KG Maschinenfabrik, Darmstadt, Germany

[22] Filed: July 29, 1971

[21] Appl. No.: 167,260

[30] Foreign Application Priority Data
July 29, 1970 Germany.................. P 20 37 732.6

[52] U.S. Cl. ............................... 73/459, 73/474
[51] Int. Cl. ............................................ G01m 1/22
[58] Field of Search ...... 73/460, 462, 471, 474, 475

[56] References Cited
UNITED STATES PATENTS
3,289,483  12/1966  Slemmons............................ 73/459
3,605,502  9/1971  Hack.................................... 73/471
3,636,773  1/1972  Harant................................ 73/475 X

FOREIGN PATENTS OR APPLICATIONS
964,937  7/1964  Great Britain....................... 73/471

*Primary Examiner*—James J. Gill
*Attorney, Agent, or Firm*—Cushman, Darby & Cushman

[57] ABSTRACT

This invention relates to a device for balancing out-of-balance bodies, particularly motor vehicle wheels, wherein the unbalance is determined in two planes of correction a and b, which has sliding and clamping means by which the out-of-balance body can be so displaced and clamped on a main shaft that the correction plane a will coincide with one of the two main shaft bearings, said bearing being adapted as a radially fixed swing bearing and the other bearing being radially movable and connected to a transducer and measuring means and an indicating instrument so that the out-of-balance is determined and eliminated in a first measuring run in correction plane b whereupon the out-of-balance is ascertained in correction plane a.

7 Claims, 1 Drawing Figure

PATENTED JAN 29 1974 3,788,147
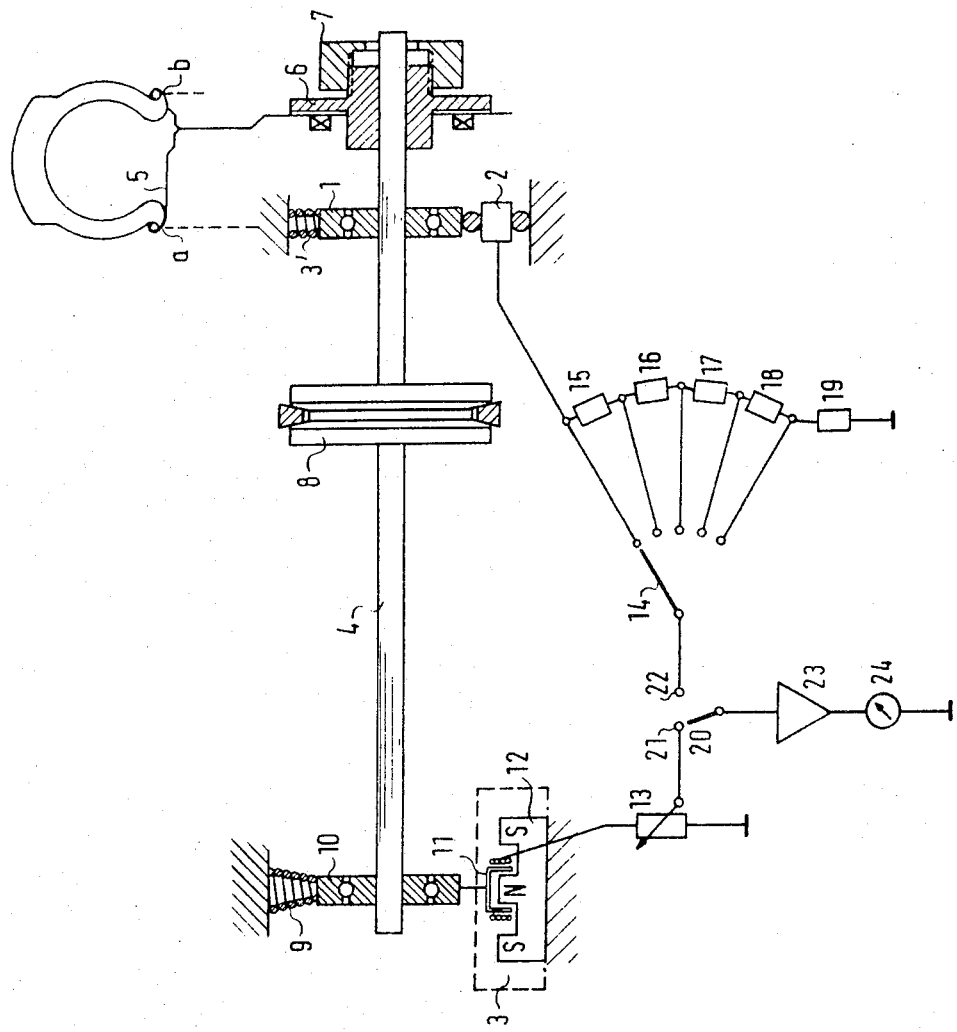
RICHARD MÜLLER
INVENTOR.
BY CUSHMAN, DARBY & CUSHMAN

DEVICE FOR THE BALANCING OF OUT OF BALANCE BODIES ESPECIALLY VEHICLE WHEELS

BACKGROUND OF THE INVENTION

Balancing machines, particularly for vehicle wheels, are known in which the wheel to be balanced is fitted on a supporting flange provided with sliding means so that the wheel can be axially displaced on the main shaft and then locked at a given point.

The main shaft of the machine is carried in a swing bearing or a ball bearing with a spring loaded joint. The wheel is so mounted on the main shaft that one correction plane will be situated in the point of oscillation of said bearing. During rotation the unbalances present in this plane, therefore, are received by the swing bearing and do not cause the main shaft to execute oscillating movements caused by the unbalances in said plane. The unbalances in the other correction plane will bring about oscillating movements about the point of oscillation of the bearing as a function of the amount of unbalance and the mass distribution of the wheel. These oscillating movements are usually measured by means of a vibration meter attached to the other end of the main shaft and are made visible by means of appropriate measuring means. From this indication can be deduced the amount and angular location of the unbalance in the correction plane not lying in the point of oscillation.

After the unbalance has been determined in and eliminated from the latter correction plane, the unbalance is determined in and eliminated from the other correction plane in which the swing bearing is situated. This will be achieved by static balancing where the heavy part of the wheel will seek a position directly below its axis. The unbalance determined this way can only be present in the plane of correction in which the swing bearing lies and is consequently also removed there.

If a wheel is balanced as described above in two planes of correction, it is a disadvantage that a sufficiently accurate static balancing of the wheel by the gravitational test for detection of unbalance in one of the two correction planes can only be achieved if the friction of the shaft bearing is small enough. For this purpose, the motor drive is usually disconnected from the main shaft of the balancing machine, which requires, however, expensive mechanical means. Also, the determination of the exact location of unbalance and of the adequate weight needed for the correction take a relatively long time and, moreover, depend on the skill of the operator. Besides, the necessary balance weight and the angular position can mostly be found out only by the trial and error method. Especially when the unbalances are relatively small an accurate correction can no longer be carried out since it is not possible to give an indication about the real balance condition of the wheel.

SUMMARY OF THE INVENTION

Based on said state of the art, it is the object of the invention to remove the aforementioned drawbacks and to propose an improved balancing apparatus. According to the invention, this problem is solved in that the radially fixed swing bearing is supported on a rigid force measuring element and that for the detection of the out-of-balance in the plane of correction in which the swing bearing is located in a second measuring run the measuring means and the indicating instrument can be disconnected from the transducer associated with the other bearing and be connected with the force measuring element by actuating a switch for the purpose of detecting the unbalance in the correction plane in which the swing bearing lies.

According to a preferred embodiment, the correction radius of the correction plane in which the swing bearing lies is taken care of by providing a step switch comprising a number of resistors in series which can selectively be inserted between the force measuring element and the switch by means of a wiper.

It is advantageous to conduct the voltage delivered by the force measuring element across a step switch or a potentiometer calibrated in diameters which are typical of the out-of-balance body such as inches in the case of motor vehicle wheels to obtain for the correction plane where the swing bearing is located a direct indication on the measuring instrument in grams or other practical units for a convenient balancing of masses.

According to a further preferred embodiment, the swing bearing is supported by spring loaded joints which are adapted so that the radial forces which develop in the bearings during the second measuring run are transmitted unrestrained to the rigid force measuring instrument without affecting the swinging of the bearing.

BRIEF DESCRIPTION OF THE DRAWING

Further details and characteristics of the invention will appear from the following description of an example of the device of the invention diagrammatically shown in the enclosed drawing.

DETAILED DESCRIPTION OF THE PRESENTLY PREFERRED EMBODIMENTS

The balancing device in the accompanying drawing comprises a main shaft 4 which is driven through a belt pulley 8 from a driving motor not shown. One end of the main shaft 4 is mounted in a radially fixed swing bearing 1 and the opposite end in a ball bearing 10 which can execute a radial movement owing to a spring 9. A spring 3' presses the swing bearing 1 into frictional engagement with a force measuring element 2 and prevents in this way radial movements of the main shaft in direction of the swing bearing 1. The spring 3' is only diagrammatically shown and is adapted in the nature of a spring loaded joint in such a manner that the radial forces of the bearings are transmitted unrestrained to the force measuring element 2 without impairment of the oscillating movement of the bearing.

The unbalanced body, for instance a motor vehicle wheel, comprises two planes of correction a and b and is carried on a supporting flange 6 which is displaceably arranged on the main shaft 4. By means of clamping means 7 the wheel 5 can so be fixed on the main shaft 4 that after the preceding displacement the swing bearing, that is to say its point of oscillation, will lie in the correction plane a. As the opposite bearing 10 is radially movable, oscillating movements develop around the swing bearing 1 during the first measuring run, said movements being picked up at the bearing 10 and converted into electrical alternating voltages by means of a transducer 3 connected therewith. The transducer 3 comprises a moving coil 11 and a magnet 12.

According to the invention, measuring means 23 and a related indicating instrument 24 are connected with the transducer 3 by means of a switch 20 and a contact 21 through the intermediary of a potentiometer 13 in a first measuring run and thus an indication is obtained of the unbalance in correction plane b on the instrument 24.

The angular location of imbalance can be determined in any conventional way, for example, using a strobascope. Alternately, as described in German Pat. No. 1,108,475, shaft 4 can be controlled by gear units and the angular location determined from the gear units.

After elimination of this unbalance the switch 20 is turned toward a contact 22 whereby the measuring means 23 and the indicating instrument 24 are connected with the rigid force measuring element 2. This connection is achieved through the intermediary of resistors 15 to 19 in series which may selectively be inserted by means of a reversible wiper 14 to take care of the correction radius in the plane of correction a.

During the second measuring run, the unbalance acting in correction plane a produces in the force measuring element 2 a voltage proportionate to the centrifugal force exerted by the unbalance in correction plane a.

In order to obtain on the instrument 24 an indication directly in appropriate units of correction, e.g., grams and the like, the aforementioned resistors 15 to 19 and the wiper 14 are provided to take care of the correction radius in the plane of correction a. The reading on the indicating instrument 24 of practical units of correction for the correction plane a is therefore not related to the distribution of mass and the weight of the wheel 5.

Instead of the step switches 14 to 19 also a potentiometer may be provided which is calibrated in the diameters typical of the out-of-balance body, such as inches in the case of motor vehicle wheels.

The measuring means 23 is a suitable amplifier. The indicating instrument 24 displays the result of balancing directly in grams.

As the unbalances are detected and measured at an invariable speed, different correction radii can be taken care of by means of the step switch in a very simple manner.

What is claimed is:

1. A device for balancing out-of-balance bodies, particularly motor vehicle wheels, with respect to two axially spaced, radially extending correction planes comprising:

a main shaft;

a radially fixed, swing main bearing supporting said shaft for rotation;

a radially movable main bearing supporting said shaft at an axially spaced disposition from said radially fixed, swing main bearing;

clamp means received upon main shaft, said clamp means being configured for selectively clamping an out-of-balance body on said shaft with the first of said two correction planes radially coinciding with the radially fixed, swing main bearing;

measuring and translating means associated with the radially movable main bearing for ascertaining and providing an output proportional to the out-of-balance in the second of said two correction planes, so the same may be eliminated, in a first step;

a rigid, force measuring element supporting said radially fixed, main swing bearing; and translating means associated with said rigid, force measuring element for providing an output proportional to the out-of-balance in the first of said two correction planes, after the out-of-balance determined for the second correction plane has been eliminated.

2. The device of claim 1 further including an indicating instrument; switch means for alternately connecting the indicating instrument to receive said output proportional to the out-of-balance in the second of said two correction planes and said output proportional to the out-of-balance in the first of said two correction planes, after the out-of-balance determined for the second correction plane has been removed.

3. The device of claim 1 wherein the second mentioned translating means includes variable resistance means for accounting for variation in the radius of said first correction plane; and means for connecting a varied resistance from said variable resistance means to the output from the rigid, force measuring element.

4. The device of claim 3 further including an indicating instrument; switch means for alternately connecting the indicating instrument to receive said output proportional to the out-of-balance in the second of said two correction planes and said output proportional to the out-of-balance in the first of said two correction planes, after the out-of-balance determined for the second correction plance has been removed, wherein said variable resistance means and said connecting means are interposed between the rigid, force measuring element and said switch means.

5. The device of claim 3 wherein the variable resistance means is constituted by a plurality of resistors connected in series and said connecting means comprises a wiper for connecting a varied amount of said resistors to the output of the rigid, force measuring element.

6. The device of claim 4 wherein the variable resistance means includes a potientometer calibrated in diameters which are typical of the out-of-balance body, the indication provided by the indicating instrument being provided in familiar mass units, such as grams of unbalance.

7. The device of claim 1 further including spring loaded joint means forcing said radially fixed swing main bearing against the rigid, force mesuring element for transmitting radial forces developed in the radially fixed, swing main bearing, substantially undiminished, to the rigid, force measuring element without substantially inhibiting the swingability of said radially fixed, swing main bearing.

* * * * *